June 5, 1956 — L. F. KOOISTRA — 2,748,597
CREEP RUPTURE TESTING APPARATUS
Filed Oct. 11, 1952 — 2 Sheets-Sheet 1

INVENTOR
Lambert F. Kooistra
BY
ATTORNEY

June 5, 1956  L. F. KOOISTRA  2,748,597
CREEP RUPTURE TESTING APPARATUS
Filed Oct. 11, 1952  2 Sheets-Sheet 2

INVENTOR
Lambert F. Kooistra
BY
Morau
ATTORNEY

United States Patent Office 2,748,597
Patented June 5, 1956

2,748,597

CREEP RUPTURE TESTING APPARATUS

Lambert F. Kooistra, Akron, Ohio, assignor to The Babcock & Wilcox Company, New York, N. Y., a corporation of New Jersey Application October 11, 1952, Serial No. 314,294

13 Claims. (Cl. 73—15.6)

This invention relates to testing apparatus for testing specimens under applied tension forces and, more particularly, to a novel stress-rupture and creep rate apparatus including a novel adjusting means for the specimen grips.

One known type of testing apparatus is designed to impart a constant tension on an elongated specimen while the latter is maintained at an elevated temperature. Such apparatus involves a pair of grips which are respectively secured to opposite ends of an elongated test specimen, generally in the form of a precisely dimensioned rod having threaded ends for engagement with the grips. As the factor to be determined by such apparatus is the elongation of the specimen, under the test conditions, it is desirable that the tensioning arrangement and grip adjustments be so designed as to exert only longitudinal stresses on the specimen.

The present invention is directed to such a stress-rupture or creep rate apparatus designed to occupy a minimum of floor space while having ample access for loading and servicing of the apparatus, and incorporating a rugged construction substantially not affected by mechanical wear. Additional features are simplicity of operation, low initial, operating, and maintenance costs, and provision for longitudinal adjustment of the specimen in the apparatus without imparting extraneous stresses to the specimen.

To this end, the invention apparatus includes a tubular supporting column on which is mounted a lever system arranged to exert a longitudinal tension on the specimen, a resistance wound electric furnace arranged to embrace and heat the specimen while being adapted for ready mounting of the specimen, and a novel double knife-edge adjustment means for applying the load to the specimen.

For an understanding of the invention principles, reference is made to the following description of a typical embodiment thereof as illustrated in the accompanying drawings. In the drawings.

Figures 1, 2:
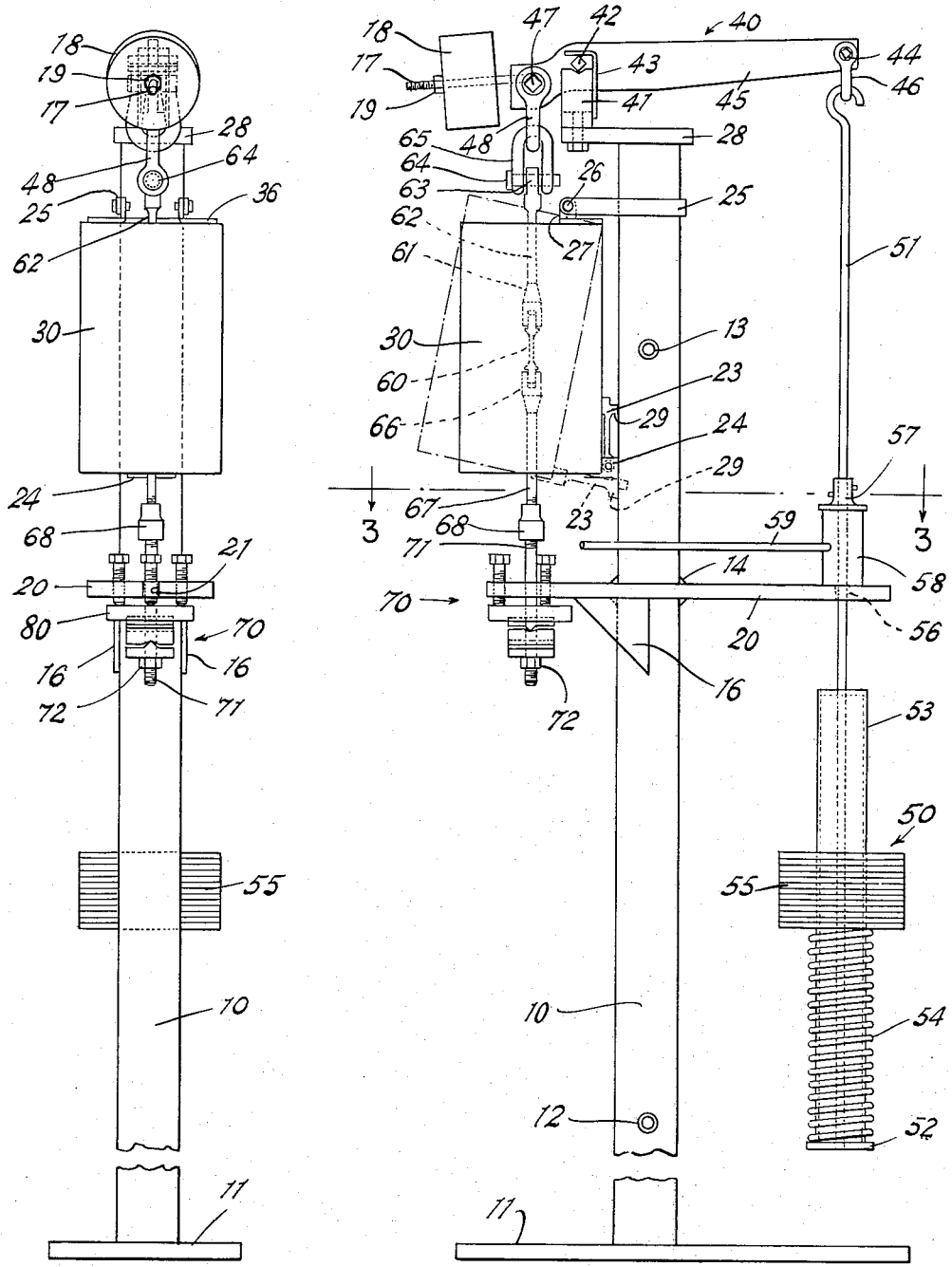
Fig. 1 is a side elevation view of creep testing apparatus embodying the invention.
Fig. 2 is a front elevation view of the apparatus.
Figure 3:
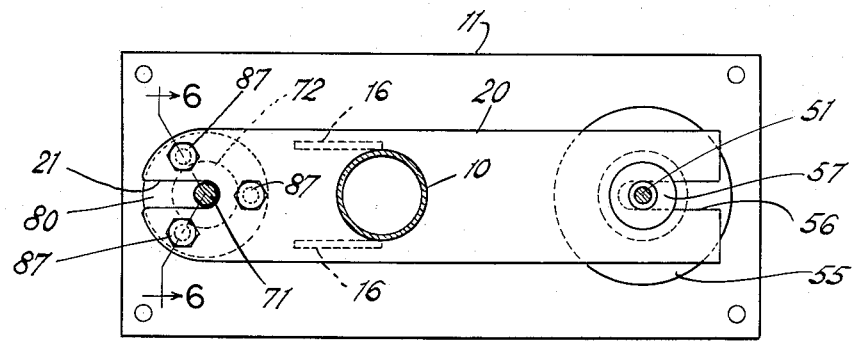
Fig. 3 is a horizontal view, partly in section, on the line 3—3 of Fig. 1.

Referring to Figs. 1, 2, and 3 of the drawings, the stress-rupture apparatus of the invention includes a vertically extending tubular column 10 mounted on a horizontal supporting base 11 and having vertically spaced openings therein in which are set bushings 12 and 13 for a purpose to be described. The tubular column or frame 10 may be a four inch O. D. tube providing the necessary column strength in a small space and having the further advantage of being neat in appearance. A little more than midway of the height of column 10, a horizontally extending elongated plate 20, forming a reference member, is rigidly mounted on column 10, being welded thereto as at 14 and braced by gussets 16.

Near its upper end, column 10 is embraced by a U-shaped collar 25 attached thereto by welding, and whose ends receive a pin 26 engaged in ears 27 on the upper end of a tubular resistance furnace 30, the latter being thus supported for swinging movement relative to column 10.

A cap member 28 attached to the upper end of column 10 supports the leverage system generally indicated at 40. The latter includes a U-shaped bracket 41 secured to cap member 28 and having V-shaped notches in its upper edges serving as spaced bearings supporting knife-edge pivots 42 on opposite sides of a lever 45. A retainer 43 secured to bracket 41 prevents upper movement of pivot 42. Near the end of the longer arm of lever 45 is a second knife-edge pivot 44 serving as a bearing for a depending shackle 46. A third knife-edge pivot 47 adjacent the end of the shorter arm of the lever serves as the bearing for a shackle 48. The relative spacing of pivots 42, 44, and 47 is such that the ratio of the two arms of the lever is 6:1.

The load applying arrangement for the apparatus, generally designated 50, is secured to the shackle 46. This arrangement includes an elongated rod 51 having a hooked end engaged in shackle 46 and carrying a seating member 52 on its lower end. An elongated tubular guide 53 extends upwardly in concentric relation with rod 51, and is embraced by a coil spring 54 engaging seating member 52 and having removable weights 55 bearing against its upper end and riding on guide 53.

Rod 51 passes through a slot 56 in plate 20 and, above this plate, has a longitudinally adjustable stop 57 mounted thereon.

In the initial loading and setting of the apparatus, stop 57 is arranged to engage a U-shaped member 58 resting on plate 20 and having an operating handle 59. Member 58, by virtue of limiting downward movement of stop 57 and rod 51, thus initially prevents weight being applied to the specimen grips. As will be described more fully hereinafter, after the specimen is loaded in the grips, adjusting means are operated to impart a counterclockwise movement to lever 40, lifting stop 57 from member 58 so that the latter can then be removed and the weights 55 be made effective to load the apparatus.

The specimen gripping and grip adjusting means are connected to the shorter arm of lever 40, this arm having projecting therefrom a threaded rod 17 on which is adjustably mounted a weight 18 retained in position by a nut 19. Weight 18 may be used for fine adjustment of the length ratio of the two arms of lever 40 to set the desired mechanical advantage of the latter.

The specimen 60, which is in the form of a rod having enlarged threaded ends, is arranged to be positioned substantially centrally of furnace 30 and in accurate axial alignment therewith. The upper end of specimen 60 is threaded into a grip 61 on a rod 62 having eye 63 through which passes a pin 64. Pin 64 is engaged in eyes of a U-shaped shackle 65 interlinked with shackle 48 and arranged at right angles thereto. The lower end of specimen 60 is secured in a grip 66 having shank 67 connected by a coupling member or adaptor 68 to a linear element such as a rod 71 forming a part of a grip adjusting mechanism generally indicated at 70 and constituting a load member for grip 66.

Figures 6, 8:
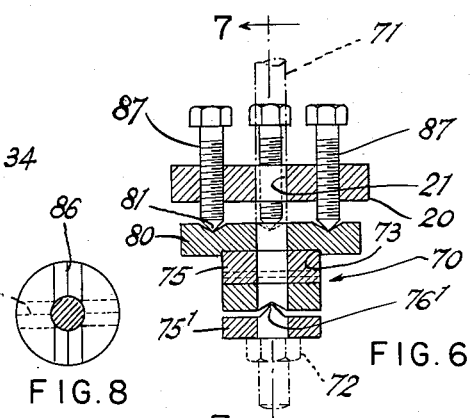
Fig. 6 is a vertical sectional view through the grip adjusting means, taken on the line 6—6 of Fig. 3.
Fig. 8 is a view of one element of the double knife-edge assembly taken on the line 8—8 of Fig. 7.
Figures 4, 7:
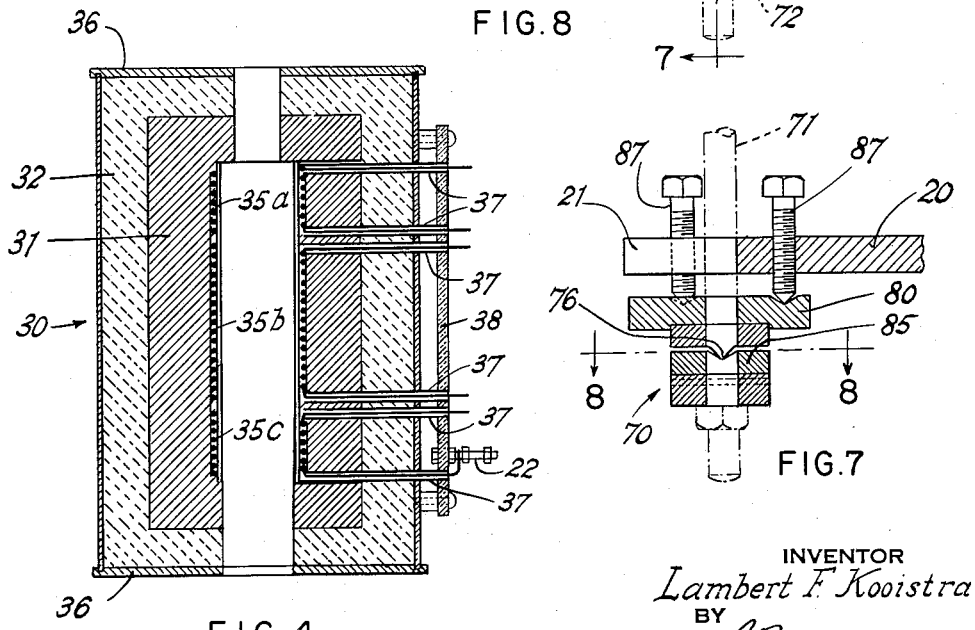
Fig. 4 is an axial sectional view through the resistance furnace.
Fig. 7 is a vertical sectional view on the line 7—7 of Fig. 6.

Adjusting mechanism 70, which is an important feature of the present invention, is shown to a larger scale in Figs. 6, 7, and 8. This adjusting mechanism is a self-centering, double knife-edge assembly designed to apply a force to the test specimen solely in longitudinal alignment with the axis thereof, and without imparting any torsional forces on the test specimen. For example, a longitudinal force could be applied to the test specimen by means of a turnbuckle arrangement, or its equivalent. However, when using an adjustment device of the turnbuckle type, a twist or torsional force is applied to the specimen as well as a longitudinal force. Thus, the test results obtained are not due solely to longitudinally applied force but are in part due to the torsional forces.

The adjusting mechanism 70 provides a means whereby forces may be applied to the test specimen parallel to the axis thereof but offset therefrom, while the net effect of such solely longitudinally applied forces is exerted only coaxially of the specimen and in longitudinal alignment therewith. Rod 71 extends vertically through a slot 21 (Fig. 3) in plate or reference member 20, and its lower end is threaded to receive an adjusting nut 72 constituting an abutment adjustable along rod 71 to provide a load member secured to grip 66 through shank 67, member 68 and rod 71. The grip adjusting mechanism 70 includes a pair of identical, and oppositely facing, annular disks 75 and 75' slidably mounted in coaxial relation on rod 71. Each of these disks is formed with a diametrically extending knife-edge 76 and 76' on one face. The disk 75 constitutes an adjustment member having its knife-edge 76 facing downwardly, and this disk fits in a circular shallow recess 73 in the lower surface of a load applying disk or bearing member 80. The knife-edge 76' of disk 75' faces upwardly, and the opposite face of this disk is engaged by nut 72. Disk 75' may be termed a load transferring member.

Disposed between disks 75 and 75' is a third annular disk 85 having, extending diametrically along its upper face, a V-shaped groove 86 serving as a bearing to receive knife-edge 76 of upper disk 75. Along its opposite and lower face, disk 85 has a second V-shaped groove 86' extending perpendicularly to groove 86 and serving as a bearing for the knife-edge 76' of the lower disk 75'.

The upper surface of the load applying disk 80 is formed with three conical recesses 81 at equal radial distances from rod 71 and arranged 120° apart. Each of these recesses is engaged by the pointed lower end of one of three studs 87 threaded through plate 20, and each coaxial with a recess 81. Studs 87 constitute load applying means applying forces to assembly 70 in a direction parallel to the longitudinal center-line of specimen 60.

Figure 5:
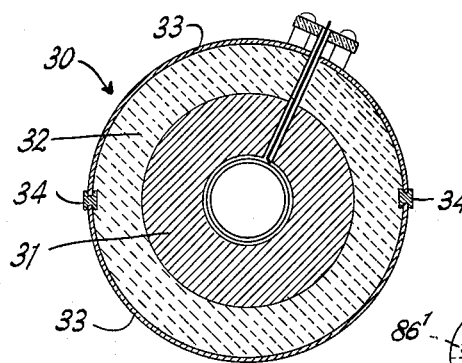
Fig. 5 is a diametric sectional view through the furnace.

The furnace 30 is best illustrated in Figs. 4 and 5. This furnace comprises a grooved cylindrical core 31, preferably of alumina insulated by one or more layers of heat resistant refractory material 32. The furnace is contained within a divided cylindrical shell of a light material, such as aluminum, comprising two half shells 33, 33. The adjacent ends of these half shells set in a pair of grooved retainer bars 34, 34, and the ends of the half shells set in circular grooves in end members 36, 36, the assembly being held together by suitable retaining means securing end members 36 to the ends of bars 34.

Three separate adjacent windings 35a, 35b, and 35c are wound on the furnace core, and the six ends of these windings are brought out through insulating tubes 37 to a terminal strip 38 mounted, through insulators 39, on shell 33. The winding ends are connected to terminals, such as 22, on strip 38, and the leads from these terminals are led through bushing 13 (Fig. 1) down through the interior of column and out through bushing 12, where they are brought into a control cabinet (not shown) which may contain a suitable automatic temperature control apparatus of the type shown in the copending application of W. T. Hage, Serial No. 295,763 filed June 26, 1952.

As stated, furnace 30 is pivotally supported on column 10 by virtue of the U-shaped bracket 25 to which are pivotally connected the ears 27 secured to the upper end member 36 of the furnace. It is important that the furnace, while being pivotally mounted so that it may be swung outwardly for easy mounting of specimens 60 in grips 61, 66, be maintained in accurate coaxial alignment with the specimen during the stress-rupture test. This is so because the temperature distribution about any given horizontal plane is dependent, to a large extent, upon the concentric positioning of the furnace about the specimen and the grips. To maintain this positioning, a bracket 23 is pivotally mounted in a lug 24 on the lower inner edge of the furnace. In the solid line position of the furnace shown in Fig. 1, an abutment 29, on the outer end of bracket 23, and the lug 24 abut both the furnace shell and column 10 and are of equal depth so that the furnace is maintained parallel to the column and concentric to specimen 60. For loading or reloading, the furnace is swung outwardly and bracket 23 is swung downwardly so that its outer end, adjacent which is abutment 29, may extend into a small aperture (not shown) in column 10.

The operation of the apparatus is as follows. To reload the apparatus, rod 51 is moved upwardly to an extent sufficient to enable member 58 to be placed between collar 57 and plate 20, thus removing the force of weights 55 from the lever system 40. The furnace 30 is then swung outwardly, as described, and held by swinging bracket 23 to the dotted line position of Fig. 1. The grips, with the specimen 60, and the knife-edge assembly 70 can be swung out with the furnace, with rod 71 moving out through slot 21, as studs 87 will be disengaged from assembly 70 due to downward movement of the assembly as rod 51 is moved upwardly away from plate 20. The grip assembly is then disengaged from the lever system by removing pin 64 from eye 63 and shackle 65, permitting the grip assembly and the specimen to be drawn downwardly through furnace 30, rod 62 fitting through the top opening of the furnace. Grips 61, 66 are then disengaged from specimen 60. After specimen 60 is thus removed, the knife-edge assembly can be conveniently suspended from plate 20 by virtue of coupling member 68 engaging the upper side of plate 20 with rod 71 extending through slot 21. A new specimen is then connected into the grips 61, 66, rod 62 is extended through the top opening of furnace 30, and pin 64 reinserted through eye 63 and shackle 65. The furnace and grip assembly are then swung back into the solid line position of Fig. 1, with bracket 23 extending upwardly, and lug 24 and abutment 29 holding the furnace in concentric relation with the specimen, with rod 71 again extending through slot 21 in plate 20.

The studs 87 are now sequentially screwed downwardly to engage disk 80, each stud being given a small movement in cyclical succession. This gradually applies a tension force to rod 71 coaxially with specimen 60, any slight non-axial force being avoided due to the double knife-edge assembly 70. The tightening of studs 87 is continued until rod 51 and collar 57 are moved upwardly sufficiently to disengage member 58. This member is then removed through the medium of handle 59 whereupon the full effect of weights 55 is applied to the long arm of lever 45, imposing the predetermined longitudinal force on specimen 60.

The double knife-edge assembly 70, or an arrangement equivalent thereto within the scope of the appended claims, has the important function of assuring application of only longitudinal forces to the test specimen, and assuring that such longitudinal forces are effective only coaxially of the specimen or on its longitudinal center-line. By virtue of the force being applied by the radially offset studs 87 to the pressure member 80, with the stud tips being locked in position in the recesses in the upper surfaces of member 80, only longitudinal forces are applied to the member 80 and no twist is imparted thereto as would be the case with a turnbuckle arrangement, for example. The interposition of the knife-edged members between the member 80 and the nut 72 assures that these longitudinal forces which are radially offset from the axis of the test specimen are effectively translated into a longitudinal force applied coaxially of the test specimen. Hence, the stresses in the specimen are only those which are due to a longitudinally applied force.

While a specific embodiment of the invention has been shown and described in detail to illustrate the application of the invention principles, it will be understood that the invention may be embodied otherwise without departing from such principles.

What is claimed is:

1. In test apparatus for applying tension forces to an elongated test specimen, including a supporting frame, a pair of grips movably mounted relative to the frame and respectively securable to opposite ends of the test specimen, and means operable to apply a predeterminable load on one of said grips in longitudinal alignment with the test specimen, mechanism operable to adjust the other grip longitudinally in longitudinal alignment with the test specimen, said mechanism comprising a reference member fixed relative to the frame; a load member secured to said other grip; a self-centering assembly arranged to apply force to said load member only along a pair of lines perpendicularly oriented in parallel planes which are perpendicular to the longitudinal center-line of the test specimen, the lines intersecting in such center line of the specimen; and load applying means interposed between said reference member and said assembly and adjustable longitudinally relative to the test specimen to apply forces to said assembly only in a direction parallel to the longitudinal center-line of the test specimen.

2. In test apparatus for applying tension forces to an elongated test specimen, including a supporting frame, a pair of grips movably mounted relative to the frame and respectively securable to opposite ends of the test specimen, and means operable to apply to a predeterminable load on one of said grips in longitudinal alignment with the test specimen, mechanism operable to adjust the other grip longitudinally in longitudinal alignment with the test specimen, said mechanism comprising a load member secured to said other grip; a reference member fixed relative to the frame disposed between said load member and said other grip; a self-centering assembly arranged to apply force to said load member only along a pair of lines perpendicularly oriented in parallel planes which are perpendicular to the longitudinal center-line of the test specimen, the lines intersecting in such center-line of the specimen, said assembly being interposed between said reference member and said load member; and adjustable load applying means interposed between said reference member and said assembly and adjustable longitudinally relative to the test specimen to apply forces to said assembly in a direction parallel to and offset from the longitudinal center-line of the test specimen.

3. In test apparatus for applying tension forces to an elongated test specimen, including a supporting frame, a pair of grips movably mounted relative to the frame and respectively securable to opposite ends of the test specimen, and means operable to apply a predeterminable load on one of said grips in longitudinal alignment with the test specimen, mechanism operable to adjust the other grip longitudinally in longitudinal alignment with the test specimen, said mechanism comprising a reference member fixed relative to the frame; a load member secured to said other grip; a double knife-edge assembly engaged with said load member; and adjustable load applying means interposed between said reference member and said assembly and adjustable longitudinal relative to the test specimen to apply forces to said assembly only parallel to the longitudinal center-line of the test specimen; the knife-edges of said assembly being perpendicularly oriented in parallel planes which are perpendicular to the longitudinal center-line of the test specimen, with the knife-edges intersecting such center-line.

4. In test apparatus for applying tension forces to an elongated test specimen, including a supporting frame, a pair of grips movably mounted relative to the frame and respectively securable to opposite ends of the test specimen, and means operable to apply a predeterminable load on one of said grips in longitudinal alignment with the test specimen, mechanism operable to adjust the other grip longitudinally in longitudinal alignment with the test specimen, said mechanism comprising a load member secured to said other grip; a reference member fixed relative to the frame disposed between said load member and said other grip; a double knife-edge assembly interposed between said reference member and said load member; and adjustable load applying means interposed between said reference member and said assembly and adjustable longitudinally relative to the test specimen to apply forces to said assembly only parallel to the longitudinal center-line of the test specimen; the knife-edges of said assembly being perpendicularly oriented in parallel planes which are perpendicular to the longitudinal center-line of the test specimen, with the knife-edges intersecting such center-line.

5. In test apparatus for applying tension forces to an elongated test specimen, including a supporting frame, a pair of grips movably mounted relative to the frame and respectively securable to opposite ends of the test specimen, and means operable to apply a predeterminable load on one of said grips in longitudinal alignment with the test specimen, mechanism operable to adjust the other grip longitudinally in longitudinal alignment with the test specimen, said mechanism comprising a reference member fixed relative to the frame; a load member secured to said other grip; a double knife-edge assembly engaged with said load member; and adjustable load applying means interposed between said reference member and said assembly and adjustable longitudinally relative to the test specimen to apply forces to said assembly only parallel to the longitudinal center-line of the test specimen; the knife-edges of said assembly extending in spaced parallel planes and lying in perpendicularly related planes having their intersection aligned with the longitudinal center-line of the test specimen.

6. In test apparatus for applying tension forces to an elongated test specimen, including a supporting frame, a pair of grips movably mounted relative to the frame and respectively securable to opposite ends of the test specimen, and means operable to apply a predeterminable load on one of said grips in longitudinal alignment with the test specimen, mechanism operable to adjust the other grip longitudinally in longitudinal alignment with the test specimen, said mechanism comprising a load member secured to said other grip; a reference member fixed relative to the frame disposed between said load member and said other grip; a double knife-edge assembly interposed between said reference member and said load member; and adjustable load applying means interposed between said reference member and said assembly and adjustable longitudinally relative to the test specimen to apply forces to said assembly only parallel to the longitudinal center-line of the test specimen; the knife-edges of said assembly extending in spaced parallel planes and lying in perpendicularly related planes having their intersection aligned with the longitudinal center-line of the test specimen.

7. In test apparatus for applying tension forces to an elongated test specimen, including a supporting frame, a pair of grips movably mounted relative to the frame and respectively securable to opposite ends of the test specimen, and means operable to apply a predeterminable load on one of said grips in longitudinal alignment with the test specimen, mechanism operable to adjust the other grip longitudinally in longitudinal alignment with the test specimen, said mechanism comprising a load member secured to said other grip; a load transferring member having a rectilinear knife-edge protruding from its surface toward said other grip; an adjustment member having a rectilinear knife-edge protruding from its surface toward said load transferring member; a bearing member interposed between said adjustment and load transferring members and having a pair of oppositely facing substantially parallel surfaces, each of said surfaces having a groove therein to receive one of said knife-edges; said grooves being perpendicular to each other; a reference member fixed relative to the frame disposed between said load transferring member and said other grip; and adjustable load applying means interposed between said reference member and said adjustment member and adjustable longitudinally relative to the test specimen to apply forces to said assembly only parallel to the longitudinal center-line of the test specimen.

8. In test apparatus for applying tension forces to an elongated test specimen, including a supporting frame, a pair of grips movably mounted relative to the frame and respectively securable to opposite ends of the test specimen, and means operable to apply a predeterminable load on one of said grips in longitudinal alignment with the test specimen, mechanism operable to adjust the other grip longitudinally in longitudinal alignment with the test specimen, said mechanism comprising a load member spaced from said other grip; a linear element connecting said load member to said other grip; a reference member fixed relative to the frame lying in a plane normal to the longitudinal center-line of the specimen and having an aperture therethrough in substantial alignment with such center-line, and disposed between said load member and said other grip; an apertured double knife-edge assembly interposed between said reference member and said load member; the knife-edges of said assembly being perpendicularly oriented in parallel planes which are perpendicular to the longitudinal center-line of the specimen, with the knife-edges intersecting such center-line; said linear element extending through the apertuers in said reference member and said assembly; and adjustable load applying means interposed between said reference member and said assembly and adjustable longitudinally relative to the test specimen to apply forces to said assembly only parallel to the longitudinal center-line of the test specimen.

9. In test apparatus for applying tension forces to an elongated test specimen, including a supporting frame, a pair of grips movably mounted relative to the frame and respectively securable to opposite ends of the test specimen, and means operable to apply a predeterminable load on one of said grips in longitudinal alignment with the test specimen, mechanism operable to adjust the other grip longitudinally in longitudinal alignment with the test specimen, said mechanism comprising a load member spaced from said other grip; a linear element connecting said load member to said other grip; a reference member fixed relative to the frame lying in a plane normal to the longitudinal center-line of the specimen and having an aperture therethrough in substantial alignment with such center-line, and disposed between said load member and said other grip; an apertured double knife-edge assembly interposed between said reference member and said load member; said linear element extending through the apertures in said reference member and said assembly; and adjustable load applying means interposed between said reference member and said assembly and adjustable longitudinally relative to the test specimen to apply forces to said assembly only parallel to the longitudinal center-line of the test specimen; the knife-edges of said assembly being perpendicularly oriented in parallel planes which are perpendicular to the longitudinal center-line of the test specimen, with the knife-edges intersecting such center-line.

10. In test apparatus for applying tension forces to an elongated test specimen, including a supporting frame, a pair of grips movably mounted relative to the frame and respectively securable to opposite ends of the test specimen, and means operable to apply a predeterminable load on one of said grips in longitudinal alignment with the test specimen, mechanism operable to adjust the other grip longitudinally in longitudinal alignment with the test specimen, said mechanism comprising a load member spaced from said other grip; a linear element connecting said load member to said other grip; a reference member fixed relative to the frame lying in a plane normal to the longitudinal center-line of the specimen and having an aperture therethrough in substantial alignment with such center-line, and disposed between said load member and said other grip; an apertured double knife-edge assembly interposed between said reference member and said load member; said linear element extending through the apertures in said reference member and said assembly; and adjustable load applying means interposed between said reference member and said assembly and adjustable longitudinally relative to the test specimen to apply forces to said assembly only parallel to the longitudinal center-line of the test specimen; the knife-edges of said assembly extending in spaced parallel planes and lying in perpendicularly related planes having their intersection aligned with the longitudinal center-line of the test specimen.

11. In test apparatus for applying tension forces to an elongated test specimen, including a supporting frame, a pair of grips movably mounted relative to the frame and respectively securable to opposite ends of the test specimen, and means operable to apply a predeterminable load on one of said grips in longitudinal alignment with the test specimen, mechanism operable to adjust the other grip longitudinally in longitudinal alignment with the test specimen, said mechanism comprising a reference member fixed relatively to the frame lying in a plane normal to the longitudinal center-line of the specimen and having an aperture therethrough in substantial alignment with such center-line; a linear element connected to said other grip and extending through such aperture; an abutment on the outer end of said element; first and second annular disks mounted on said element between said reference member and said abutment, each of said disks having a knife-edge extending diametrically of one surface and the knife-edges facing each other; a third annular disk mounted on said element between said first and second disks, and having grooves extending diametrically of each of its opposite surfaces for engagement by said knife-edges; said grooves extending perpendicularly to each other; and adjustable load applying means interposed between said reference member and the other surface of said first annular disc and adjustable longitudinally relative to the test specimen to apply forces to said assembly only parallel to the longitudinal center-line of the test specimen, the other surface of said second annular disc engaging said other abutment.

12. Testing apparatus comprising, in combination, an elongated vertical column; a pair of grips movably mounted relative to the column and respectively securable to opposite ends of an elongated vertically extending test specimen; a lever pivotally mounted, intermediate its ends, on the upper end of said column; means connecting the upper grip to one end of said lever and extending substantially parallel to said column; a horizontal plate secured to said column intermediate the ends of the latter and extending laterally therefrom; a furnace secured to said column between said plate and the upper end of the column and having a passage therethrough aligned with the test specimen and embracing the latter and said grips; a load member secured to the lower grip and lying below said plate; a double knife-edge assembly interposed between said plate and said load member; the knife-edges of said assembly being perpendicularly oriented in parallel planes which are perpendicular to the longitudinal center-line of the specimen, with the knife-edges intersecting such center-line; adjustable load applying means interposed between said plate and said assembly and adjustable longitudinally relative to the test specimen to apply forces to said assembly only parallel to the longitudinal center-line of the test specimen; and means operable to apply a predetermined load to the other end of said lever to stress the specimen while it is heated by said furnace.

13. Testing apparatus comprising, in combination, an elongated vertical column; a pair of grips movably mounted relative to the column and respectively securable to opposite ends of an elongated vertically extending test specimen; a lever pivotally mounted, intermediate its ends, on the upper end of said column; means connecting the upper grip to one end of said lever and extending substantially parallel to said column; a horizontal plate secured to said column intermediate the ends of the latter and extending laterally therefrom, said plate having an aperture therethrough in substantial vertical alignment with the test specimen; a linear element connected to the lower grip and extending through such aperture; an abutment on the outer end of said element; first and second annular disks mounted on said element between said plate and said abutment, each of said disks having a knife-edge extending diametrically of one surface and the knife-edges facing each other; a third annular disk mounted on said element between said first and second disks, and having grooves extending diametrically of each of its opposite surfaces for engagement by said knife-edges; said grooves extending perpendicularly to each other; adjustable load applying means interposed between said plate and the other surface of said first annular disk and adjustable longitudinally relative to the test specimen to apply forces to said assembly only parallel to the longitudinal center-line of the test specimen, the other surface of said second annular disk engaging said other abutment; a furnace secured to said column between said plate and the upper end of the column and having a passage therethrough aligned with the test specimen and embracing the latter and said grips; and means operable to apply a predetermined load to the other end of said lever to stress the specimen while it is heated by said furnace.

References Cited in the file of this patent
UNITED STATES PATENTS

| | | |
|---|---|---|
| 1,122,289 | Loveland | Dec. 29, 1914 |
| 1,340,318 | Boyd | May 18, 1920 |
| 1,627,124 | Starr | May 3, 1927 |
| 1,872,047 | Templin | Aug. 16, 1932 |
| 2,375,034 | Semchyshen | May 1, 1945 |
| 2,436,317 | Manjoine | Feb. 17, 1948 |
| 2,545,482 | Manjoine et al. | Mar. 20, 1951 |